(No Model.)  2 Sheets—Sheet 2.
D. K. BARNHART.
SAW TABLE GAGE.

No. 271,018. Patented Jan. 23, 1883.

WITNESSES:
J. D. Garfield
C. Sedgwick

INVENTOR:
D. K. Barnhart
BY Munn & Co
ATTORNEYS.

UNITED STATES PATENT OFFICE.

DANIEL K. BARNHART, OF GAINES, PENNSYLVANIA.

SAW-TABLE GAGE.

SPECIFICATION forming part of Letters Patent No. 271,018, dated January 23, 1883.

Application filed September 28, 1882. (No model.)

*To all whom it may concern:*

Be it known that I, DANIEL K. BARNHART, of Gaines, in the county of Tioga and State of Pennsylvania, have invented a new and Improved Measuring Saw-Gage, of which the following is a full, clear, and exact description.

My invention consists of a saw-gage for setting lumber to a sawing-machine and gaging it to measure, the said setting-gage having a scale combined and arranged with it, by which to indicate the distance necessary to shift the gage for setting it to cut strips of any required width, also having a dividing-plate and stop device for setting the gage to special sizes, all as hereinafter fully described.

Reference is to be had to the accompanying drawings, forming part of this specification, in which similar letters of reference indicate corresponding parts in both the figures.

Figure 1:
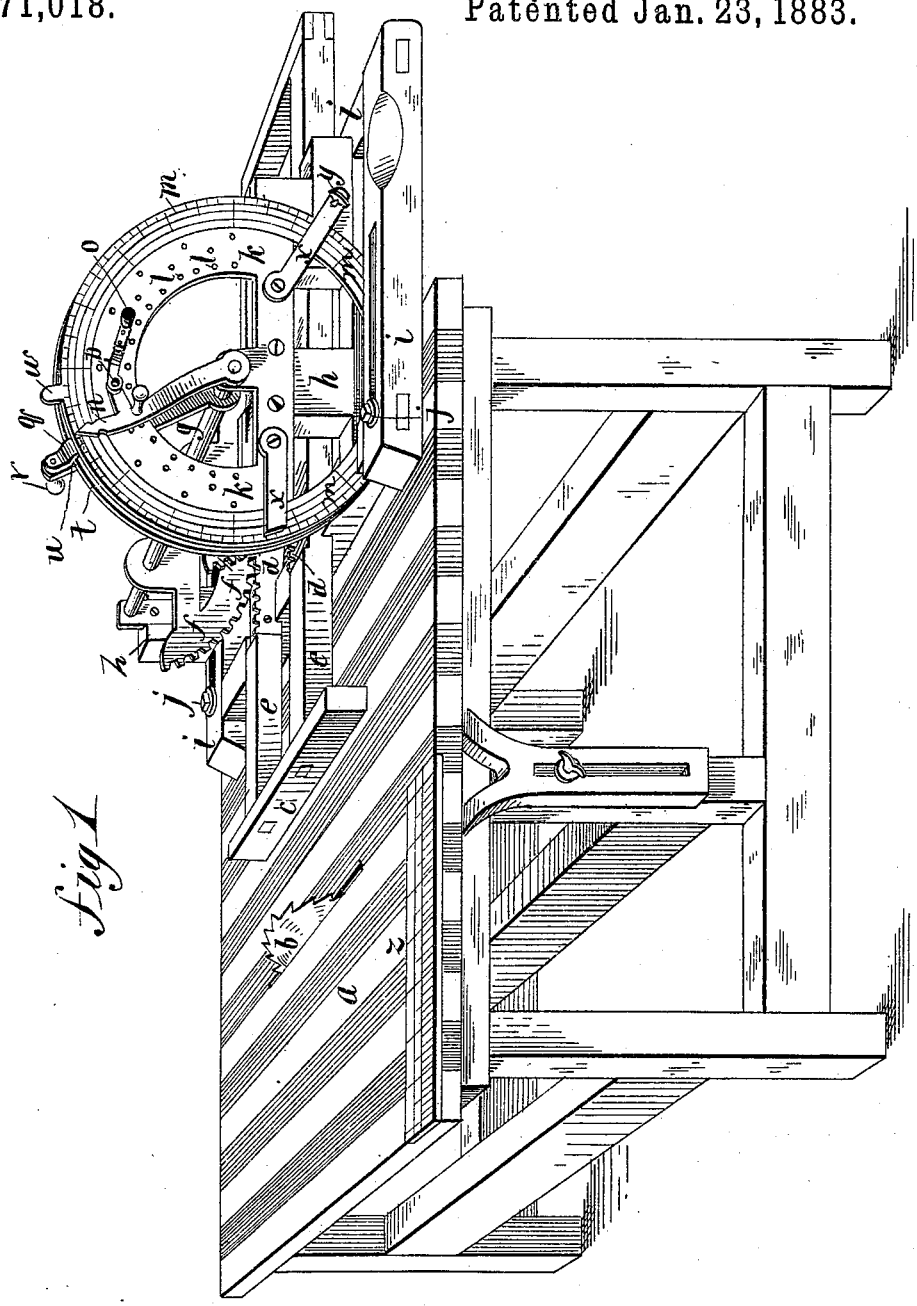
Figure 2:
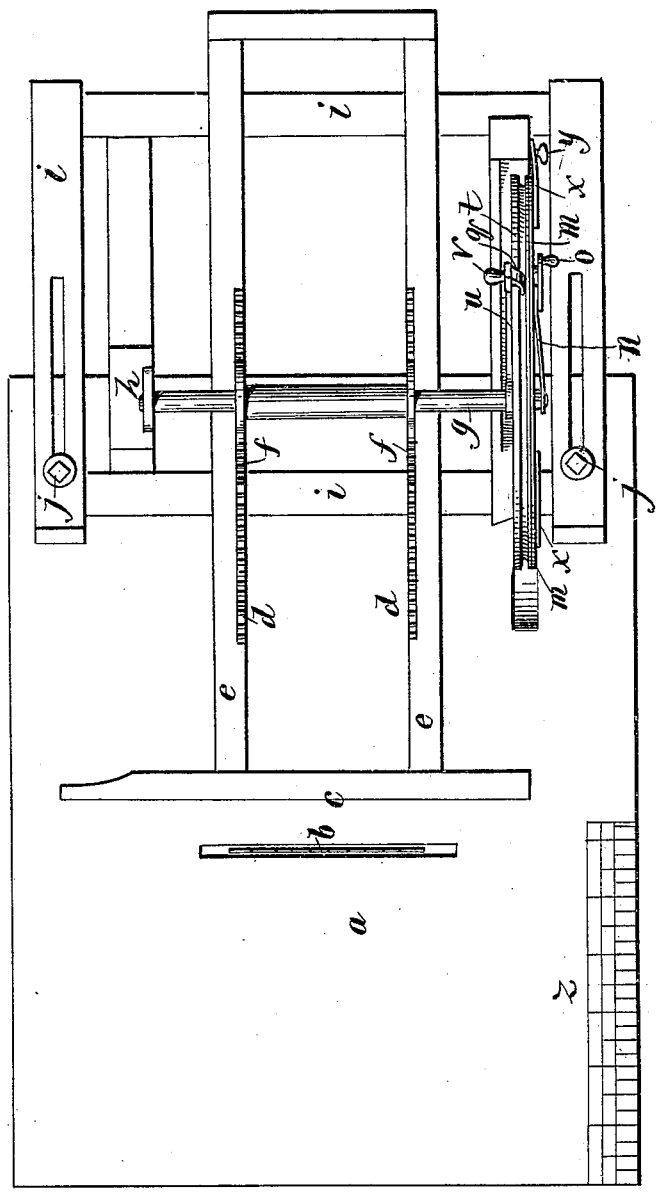

Figure 1 is a perspective view of a sawing-machine with my improved measuring-gage, and Fig. 2 is a plan view of the same.

The saw-table $a$, saw $b$, and the setting-gage $c$ itself may be the same as in common use. I attach toothed racks $d$ to the frame $e$ of the gage $c$ to gear the gage with the toothed segments $f$ of the shaft $g$, mounted in the upper ends of the standards $h$ of a bed-frame, $i$, adjustably secured to the table $a$ by bolts $j$. Over the shaft $g$ is a semicircular dividing-plate, $k$, with several series of setting-holes, $l$, for setting the gage to special sizes, and surrounding this dividing-plate there is a ring, $m$, having a scale of lineal measure marked on its face, along which to move a pointer, $n$, attached to shaft $g$ to set the gage $c$ to any measure not given by the dividing-plate.

When the gage is set by the dividing-plate $k$ the stop-pin $o$ will spring into the plate and hold the gage. The pin $o$ is fitted to an arm that is pivoted at $p$ to a bracket of the pointer-arm $n$ to allow the stop-pin to range with the different series of dividing-holes $l$.

When the pointer $n$ is to be set by the scale $m$ a button, $q$, will be used to secure the gage $c$ by gripping the flange $t$ of the dividing-plate, said button being pivoted to the end of an arm, $u$, attached to shaft $g$, so that by turning the button with the knob $v$ it will bind the arm $u$ to said flange, or release it, according as it is turned one way or the other.

The scale-ring $m$ is made adjustable around the shaft $g$ in order that it may be shifted to set the starting-point with respect to the pointer $n$ in any position that may be required for the beginning by the width of the board to be sawed. Said ring has a finger-stud, $w$, for so shifting it, and it is confined in the recess made for it in the arc of the dividing-plate by the buttons $x$, one of which has a clamp-screw, $y$, to fasten it. A scale, $z$, located on the table at the other side of the saw, will show to the operator how many strips the rest of the board will make after the gage $c$ is set and the board set to it.

The frame $i$ is made adjustable by the bolts $j$, and the slots made for them in said frame, to enable the gage $c$ to be properly set parallel with the saw and at the required distance from it.

Having thus fully described my invention, I claim as new and desire to secure by Letters Patent—

1. The gage $c$, provided with the parallel bars $e$, and the racks $d$, attached thereto, in combination with the toothed segments $f$, the shaft $g$, carrying the same, the arm $n$ on said shaft, the dividing-plate $k$, provided with different circles of holes $l$, and the stop-pin $o$, adjustably attached to arm $n$, whereby the pin may be set to range in either circle of holes in order that the gage $c$ may be shifted to the fixed distances corresponding thereto.

2. The combination, with the gage $c$, racks $d$, toothed segments $f$, shaft $g$, the dividing-plate $k$, provided with a flange, $t$, and an annular recess, the pointer-arm $n$, and the clamping-arm $u$, provided with button $v$, of the scale $m$, adapted to rotate in said annular recess, and means for adjustably securing the same, as and for the purpose specified.

DANIEL K. BARNHART.

Witnesses:
I. J. RITTER,
WM. G. SEARS.